(12) United States Patent
Persson

(10) Patent No.: US 9,822,918 B2
(45) Date of Patent: Nov. 21, 2017

(54) BENDING RESTRICTOR ASSEMBLY FOR A PIPELINE

(71) Applicant: Tor Persson, Houston, TX (US)

(72) Inventor: Tor Persson, Houston, TX (US)

( * ) Notice: Subject to any disclaimer, the term of this patent is extended or adjusted under 35 U.S.C. 154(b) by 219 days.

(21) Appl. No.: 14/824,630

(22) Filed: Aug. 12, 2015

(65) Prior Publication Data

US 2017/0045177 A1 Feb. 16, 2017

(51) Int. Cl.
| F16L 11/00 | (2006.01) |
| F16L 57/02 | (2006.01) |
| F16L 1/20 | (2006.01) |
| F16L 3/12 | (2006.01) |

(52) U.S. Cl.
CPC ............... *F16L 57/02* (2013.01); *F16L 1/20* (2013.01); *F16L 3/1226* (2013.01)

(58) Field of Classification Search
USPC .......................................... 138/110, 119, 120
See application file for complete search history.

(56) References Cited

U.S. PATENT DOCUMENTS

| 1,677,077 | A | | 7/1928 | Fortune | |
| 3,674,014 | A | * | 7/1972 | Tillander | A61B 1/0055 138/120 |
| 3,908,703 | A | * | 9/1975 | Bournazel | F16L 11/08 138/120 |
| 4,396,797 | A | * | 8/1983 | Sakuragi | F16L 11/18 138/110 |
| 5,192,166 | A | | 3/1993 | Persson | |
| 5,215,338 | A | * | 6/1993 | Kimura | F16L 3/015 138/120 |
| 5,403,121 | A | | 4/1995 | Lanan | |
| 5,490,742 | A | * | 2/1996 | Cronk | F16L 57/00 138/110 |
| 5,806,615 | A | * | 9/1998 | Appleton | E21B 17/1078 138/110 |
| 6,220,303 | B1 | * | 4/2001 | Secher | E21B 17/017 138/109 |
| 8,562,255 | B2 | | 10/2013 | Persson | |
| 8,869,840 | B2 | * | 10/2014 | Lund | E21B 17/017 138/109 |
| 2005/0247366 | A1 | * | 11/2005 | Tyrer | F16L 1/123 138/157 |
| 2006/0231151 | A1 | * | 10/2006 | Sasaki | F16L 53/005 138/149 |

(Continued)

*Primary Examiner* — James Hook
(74) *Attorney, Agent, or Firm* — Egbert Law Offices, PLLC

(57) ABSTRACT

A bending restrictor assembly has a pipeline section, a first pipe section affixed to the pipeline section overlying the outer diameter of the pipeline section, a second pipe section affixed to the pipeline in spaced relation to the first pipe section and overlying the outer diameter of the pipeline section, a first collar element having at least a portion positioned between the first and second pipe sections in which the portion overlies the outer diameter of the pipeline section, a second collar element having at least a portion positioned between the first and second pipe sections in which the portion overlies the outer diameter of the pipeline section, and at least one stop member cooperative at the first and second collar elements so as to limit the relative movement of the first and second collar elements so as to limit the bending of the pipeline section.

6 Claims, 6 Drawing Sheets

(56) References Cited

U.S. PATENT DOCUMENTS

2009/0308478 A1\* 12/2009 Vo .......................... F16L 11/08
 138/109
2010/0329792 A1 12/2010 Persson \* cited by examiner

BENDING RESTRICTOR ASSEMBLY FOR A PIPELINE

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to apparatus for controlling the bending of a pipeline. In particular, the present invention is a bending restrictor assembly that serves to limit the bending of a pipeline. Additionally, the present invention relates to bending restrictor assemblies that are used to produce control bending of the pipeline beyond elastic limits. The present invention also relates to bending restrictor assemblies which limit the amount of bending that can occur in the pipeline during the laying of the pipeline or during the maintaining of the pipeline at the seafloor.

2. Description of Related Art including Information Disclosed Under 37 CFR 1.97 and 37 CFR 1.98.

Subsea pipelines are typically assembled one segment at a time aboard a pipeline-laying vessel. As each segment is added, the vessel moves forward and the pipeline follows a descending path to the sea floor. The suspended pipe span between the vessel stern and the sea floor is typically supported partly by a ramp attached to the vessel and axial tension is applied to the pipe which maintains the pipeline steel within elastic boundaries until reaching on the seabed.

The steel pipelines that are laid on the bottom of the sea cannot be pre-formed or pre-adapted to the contour of the sea floor. This is because of the above-identified laying and installation procedure.

There may be tolerated a certain degree of unevenness over which the pipeline is capable of spanning or bending, provided that the specific load does not produce excessively high stresses in the pipeline steel or cause vortex-induced vibrations. If stresses exceed allowable limits, the pipeline could be deformed permanently, either by buckling or cold bending, or both to an unacceptable configuration. Should cold bending occur through yielding of the steel in the pipeline, it could propagate uncontrollably. Requirements set by classification societies for construction and operation of offshore pipelines permit a certain degree of cold bending beyond elastic limits provided that it takes place under controlled conditions. Parameters for such controlled conditions entail that a pipeline may be cold bent to a minimum radius less than what is allowed for uncontrolled bending.

Pipelines that are laid on an uneven sea floor are subjected to free spanning because of the rigidity of the pipeline. Specifications used for submarine pipeline installation permits plastic deformation as long as positive measures are taken to ensure that excessive bending is prevented. By allowing plastic deformation, it is possible to reduce to a considerable degree the occurrence of free spanning Bending beyond elastic limits may be achieved by overloading the pipeline by applying external loads.

Submarine pipelines having a diameter of more than twelve inches usually require a weight coating to achieve negative buoyancy. This is necessary if the pipeline is to be submerged and also maintain a stable state with respect to the sea current. Plastic deformation of a pipeline having a weight coating of concrete will cause the concrete to crack and break loose.

In the past, various patents and publications have issued relating to the controlling of the bending of a pipeline. For example, U.S. Pat. No. 5,192,166, issued to the present inventor, describes a method for controlled bending of a pipeline during the laying thereof in the sea. This method utilizes bend controlling/stopping means which are mounted on the pipeline and interact with the pipeline. To achieve cold bending under controlled conditions, the pipeline is weight-loaded internally at the selected bending zone. The weight-loading may be achieved by means of a flexible string of weight elements and/or by introducing into the pipe a suitable heavy, readily flowable weight mass, for example, drilling fluid or water.

U.S. Pat. No. 5,403,121, issued on Apr. 4, 1995 to Lanan, describes a method for accommodating thermal expansion of a buried subsea pipeline. This method includes the steps of providing a pipeline which bends in alternating essentially opposed directions. The angles of the bends and the distance between the bends are sufficiently small so that the pipeline is not plastically deformed when resting on the seabed. The number and angles of the bends are sufficiently large to prevent upheaval buckling. The bend angles and distance between the bends is small enough that the pipeline can be passed through a tensioning machine and ramp of a pipeline-laying vessel. The pipeline can then be installed on the sea floor.

U.S. Pat. No. 1,677,077, issued on Jul. 10, 1928 to D. D. Fortune, describes a hose protector in which a flexible sheath is connected to a collar. The sheath comprises a plurality of sections pivotally connected together. Each section is formed of a plurality of rings. Straps connect the rings together. An end of each strap projects beyond a ring and is pivotally connected to a ring of an adjacent section. The collars form a plurality of section pivotally connected together. This method is applicable for preventing kinking of a flexible hose, U.S. Patent Publication No. 2010/0329792, published on Dec. 30, 2010 to the present inventor, describes a controlled bending of a pipeline by an external force. A bending collar assembly is attached to a selected bending zone of the pipeline so as to limit the control bending of the pipeline to a predetermined resulting bending configuration. External force is then applied on the bending collar assembly so as to bend the pipeline to the resulting bending configuration in cooperation with the bending collar assembly and the sea floor. The external force can be exerted from one or more weights placed on top of the bending collar assembly.

U.S. Pat. No. 8,562,255, issued Oct. 22, 2013 to the present inventor, describes a bending restrictor assembly for use with a pipeline section. The bending restrictor assembly has a sleeve affixed to the pipeline section, an outer collar slidably positioned relative to an over the sleeve, and it inner collar slidably positioned relative to an interior of the outer collar. The inner collar is in spaced longitudinal relation to an end of the sleeve. The inner and outer collars are slidable relative to a bending of the pipeline section. A series of holes and keyways are formed in the inner and outer collars. Pins are inserted into corresponding holes and keyways so as to correspond to a limit of the bending radius of the pipeline section.

It is an object of the present invention to provide a bending restrictor assembly that allows cold bending to be achieved at the seabed during pipeline installation operations.

It is another object the present invention to provide a bending restrictor assembly which allows for a pipeline to bend within predetermined limits.

It is another object of the present invention to provide a bending restrictor assembly which, when applied, can alleviate seabed preparation and post-installation corrections.

It is another object of the present invention to provide a bending restrictor assembly which can be installed on the pipeline section before being added to the pipeline as part of a final installation.

It is another object of the present invention to provide a bending restrictor assembly which can result in significant cost savings.

It is still further object of the present invention to provide a bending restrictor assembly which provides for the easy installation of smooth transition areas between the pipeline and the bending restrictor assembly.

It is still another object of the present invention provide a bending restrictor assembly which enhances the strength of the pipeline in the area of the transition between the pipeline of the bending restrictor assembly.

These and other objects and advantages of the present invention will become apparent from a reading of the attached specification and appended claims.

BRIEF SUMMARY OF THE INVENTION

The present invention is a bending restrictor assembly that comprises a pipeline section, a first pipe section affixed to the pipeline section and overlying the outer diameter of the pipeline section, a second pipe section affixed to the pipeline section in spaced relation to the first pipe section and overlying the outer diameter of the pipeline section, a first collar element having at least a portion positioned between the first and second pipe sections, a second collar element having at least a portion positioned between the first and second pipe sections, at least one stop member cooperative with the first and second collar elements so as to limit the relative movement of the first and second collar elements and one pipe section in order to limit the cold bending of the pipeline section. The portion of the first collar element overlies the outer diameter of the pipeline section. The portion of the second collar element overlies the outer diameter of the pipeline section. The first and second collar elements and one pipe section are movable relative to each other as the pipeline section is bent.

The first collar element comprises a plurality of first collar elements. At least one of the plurality of first collar elements has another portion overlying an outer diameter of the first pipe section. Each of the first collar elements has a notch formed therein. The stop element comprises a plurality of cuboid elements that are positioned in the notch in side-by-side relation in a location outwardly of the outer diameter of the pipeline section. The notch has a width dimension that is greater than a size of each of the plurality of cuboid elements. The portion of the second collar element overlies or underlies the portion of the first collar element. The plurality of cuboid elements are positioned between these portions of the first and second collar elements. Each of the first collar elements has a hole extending therethrough so as to open to an exterior of the first collar element. The hole has a size greater than a size of each of the plurality of cuboid elements. A closure element is affixed within or over the hole. This method facilitates installation of the stop member between the collars.

The first collar element can have various configurations. In one configuration, the first collar element has an outer section and an inner section integrally formed together. The portion of the second collar element overlies the inner section of the first collar element. In another configuration, the first collar element can include an outer section and an inner section underlying a portion of the outer section. The outer section is slidable over an outer diameter of the portion of the inner section.

In another embodiment of the present invention, there is a third collar element overlying the first and second collar elements. The third collar element has a plurality of receptacles formed therethrough. The first and second collar elements have slots formed therein. The stop member comprises a plurality of pins respectively affixed in the plurality of receptacles and respectively extending into the plurality of slots. Each of the plurality of slots has a length dimension that is greater than a diameter of each of the plurality of pins so as to limit relative movement of the third collar with respect to the first and second collar elements. The third collar element has a first end that overlies an outer diameter of the first pipe section and a second end that overlies an outer diameter of the second pipe section. The first end of the third collar element has at least one receptacle formed therein. The pipe section has at least one slot formed therein. The stop element includes a pin that has an end affixed to the receptacle of the third collar element and slidably positioned in the slot of the first pipe section. The slot has a length dimension that is greater than a diameter of the pin. A fourth collar element overlies an outer diameter of the third collar element. The third collar element is slidably movable relative to the fourth collar element during the bending of the pipeline section.

In still another embodiment of the present invention, the first collar element overlies the second collar element. The stop member includes a first flange integrally formed with the first collar element and extends inwardly thereof so as to define a first shoulder, and a second flange integrally formed with the second collar element and extending outwardly thereof so as to define a second shoulder. The first and second flanges move with respect to each other during the bending of the pipeline section. The shoulders of the flanges will contact each other when a bending limit is achieved. In particular, in this embodiment, the stop member includes a pair of flanges formed on the first collar element extending inwardly thereof in spaced relation to each other. The second collar element includes a pair of second collar elements in which each of the pair of second collar elements has a flange extending outwardly thereof. The flanges of the pair of second collar elements are positioned between the pair of flanges of the first collar element. At least one sleeve covers the collar elements and retains them against the pipeline section. Alternatively, the outer collar elements can be split collars that can be fastened together around the inner collar elements.

In the present invention, the first pipe section has an end opposite to the first and second collar elements that tapers toward the outer diameter of the pipeline section. The second pipe section has an end opposite to the first and second collar elements that tapers toward the outer diameter of the pipeline section.

This foregoing Section is intended to describe, with particularity, the preferred embodiments of the present invention. It is understood that modifications to these preferred embodiments can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Referring to FIGS. 1-5, there is shown a prior art bending restrictor assembly in accordance with the teachings of U.S. Pat. No. 8,562,255 to the present inventor and incorporated by reference herein. In general, the bending restrictor assembly of U.S. Pat. No. 8,562,255 is illustrated for the purpose of showing the function of the bending restrictor assembly. It is understood that the present invention provides a different structure which achieves different advantages, but fundamentally, the function and relation between the collar elements and the pipeline section will be of a similar nature. As such, FIGS. 1-5 are instructive as to the overall operation of the present invention and in particular, showing how the bending restrictor assembly of the present invention is suitable for restricting pipeline section movement in both compression and extension.

Figure 1:
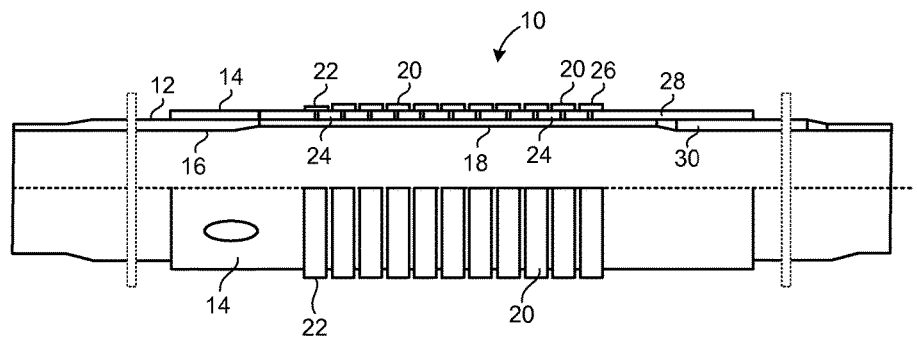
FIG. 1 is a cutaway view of the bending restrictor assembly of the prior art as applied to a pipeline section.

Referring to FIG. 1, there is shown the bending restrictor assembly 10 in accordance with the teachings of the prior art. As can be seen, the bending restrictor assembly 10 is applied to a pipeline section 12. The pipeline section 12 has a length dimension and an outer diameter. The bending restrictor 10 includes as collar 14 that is affixed to the outer diameter of the pipeline section 12. In particular, collar 14 is illustrated as affixed to a widened thickness portion 16 of the pipeline section adjacent one end of the pipeline section 12. The inclusion of the length of the pipeline section 12 determined by the installation placement of the collar 14 at the widened thickness portion 16 of the pipeline section 12 assures that bending occurs in the area where the wall thickness of the pipeline section is minimal, generally in the central area 18.

As can be seen in FIG. 1, there are plurality of outer collars 20 that are arranged around the outer diameter of the pipeline section 12 and are positioned in generally spaced longitudinal relationship to each other. Each of the collars 20 will extend entirely around a diameter of the pipeline section 12. The first outer collar 22 is illustrated as extending over the outer diameter of the collar 14. A plurality of inner collars 24 are arranged so as to extend between the respective plurality of outer collars 20. The plurality of inner collars 24 are arranged in spaced longitudinal relationship to each other. Each of the plurality of inner collars 24 will have an inner diameter greater than the outer diameter of the pipeline section 12. Each of the inner collars 24 has an outer diameter that generally corresponds to the inner diameter of the outer collars 20. As such, the arrangement of outer collars 20 and inner collars 24 can be slidably linked together so as to fix the bending limits of the pipeline section 12.

An outer collar 26 is located at the end of the bending restrictor assembly 10. Another collar 28 is slidably received within the interior of the outer collar 26. The collar 28 also extends over a widened thickness 30 of the pipeline section 12. Collars 14 and 28 are utilized so as to restrict the bending from affecting the structurally strong connector areas located at the opposite ends of the pipeline section 12. As such, the bending restrictor assembly 10 assures the integrity of the pipeline section upon which it is placed.

Figure 2:
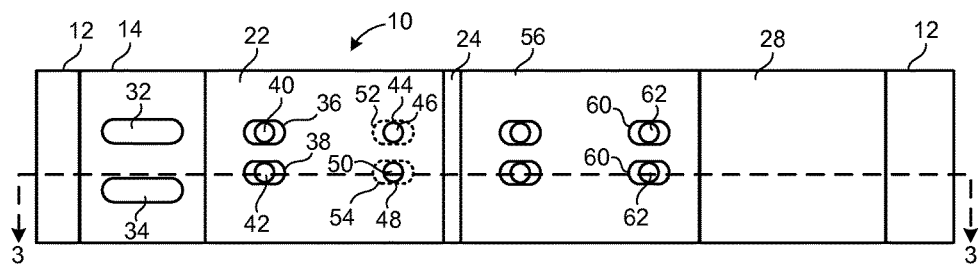
FIG. 2 is a plan, partially-transparent view showing the bending restrictor assembly of the prior art.

FIG. 2 shows a circumferential segment of the bending restrictor assembly 10. As can be seen, the collar 14 is affixed to the pipeline section 12. A pair of slots 32 and 34 are provided on the collar 14 so as to facilitate the ability to weld the collar 14 to the pipeline section 12. The first outer collar 22 is illustrated as extending over the outer diameter of the collar 14. The first outer collar 22 is illustrated as having a pair of keyways 36 and 38 formed through the wall thereof. A pin 40 will extend into the keyway 36. Another pin 42 will extend into the keyway 38. The diameter of the pins 40 and 42, along with the length of the keyways 36 and 38, are components which determine the limit of bend of the pipeline section 12. Another collar 28 is formed at the opposite end of the bending restrictor assembly 10. As can be seen in FIG. 2, each of the keyways has a length greater than the diameter of each of the respective pins.

The first outer collar 22 also includes a hole 44 formed through the wall thereof. A pin 46 is threadedly affixed within the hole 44. Another hole 48 is also formed through the wall of the first outer collar 22. A pin 50 is threadedly received by the hole 48. Pins 46 and 48 will extend radially inwardly of the outer collar 22 so as to be received by keyways 52 and 54 (illustrated in broken line fashion) on the inner collar 24.

In FIG. 2, it can be seen that the inner collar 24 extends through the space between one end of the first outer collar 22 and the second collar 56. Second outer collar 56 has a configuration similar to that of the first outer collar 22. The second outer collar 56 includes suitable keyways and holes so as to facilitate the connection with the inner collar 24. It should be noted that, within the concept of the present invention, all of the pins could be placed into the outer collar so as to extend into keyways in the collars and the inner collars. This facilitates the ability to assemble the bending restrictor assembly.

FIG. 2 shows a limited arrangement of the outer collars 20 and the inner collars 24. Ultimately, the collar 28 is illustrated as extending over the pipeline section 12 at the end of the arrangement of outer collars 20. The collar 28 will include keyway 60 which serves to receive pins 62 affixed within the holes of the second outer collar 56.

Figure 3:
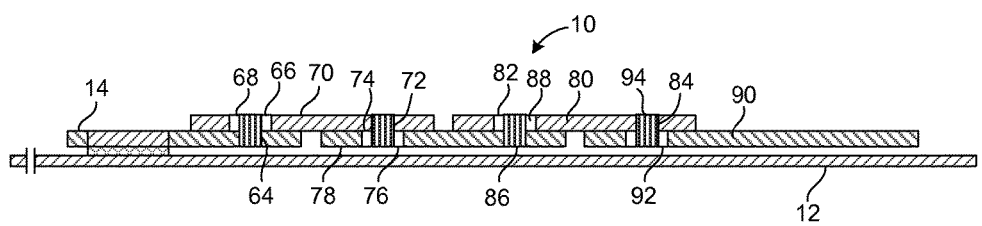
FIG. 3 is a partial cross-sectional view showing the bending restrictor assembly of the prior art as applied to a pipeline section in which the bending restrictor assembly is in an originally assembled position.

FIG. 3 illustrates the arrangement of the outer collars and inner collars at the point of installation upon the pipeline section 12. In FIG. 3, it can be seen that the collar 14 is welded to the outer diameter of the pipeline section 12. The collar 14 includes a hole 64 formed at a location away from the welded connection. The hole 64 is suitably threaded so as to receive a pin 66 therein. Pin 66 has a portion extending into the keyway 68 of the outer collar 70. Because of the use of the keyway 68, the outer collar 64 will be in slidable relationship with the collar 14. The pin 66 serves to limit the amount of sliding motion that can occur.

The outer collar 70 has a threaded hole 72 that receives a pin 74 therein. Pin 74 will extend downwardly so as to be received within a keyway 76 associated with an inner collar 78. The arrangement of holes and keyways facilitates the ability to install the bending restrictor assembly 10 of the present invention. In other words, it is only necessary to align the respective keyways with the respective holes. The pins can then be inserted through the keyway so as to threadedly engage the hole or threadedly inserted into the threaded hole so as to ultimately have a portion extending into the keyway. Other techniques, such as welding or pressing can also be used so as to cause the pins to be fixed within their respective holes.

In FIG. 3, there is a second outer collar 80 also having a keyway 82 and a hole 84 formed therein. The inner collar 78 includes a hole 86 that serves to receive pin 88 therein. Similarly, a second inner collar 90 (or collar) will have a keyway 92 formed therein. Pin 94 is threadedly affixed within hole 84 so as to extend into the keyway 92.

In FIG. 3, since each of the respective pins 66, 74, 88 and 94 reside centrally of the keyways, the pipeline section 12 is in a straight configuration. The spacing of the keyways and holes, along with the spacing of the inner and outer collars, assures that the bending radius of the pipeline section 12 is properly controlled.

Figure 4:
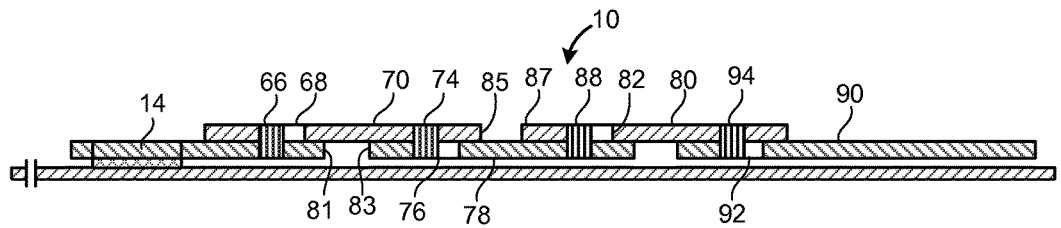
FIG. 4 is a partial cross-sectional view of the bending restrictor assembly of the prior art as applied by pipeline section in which the bending restrictor assembly is shown in extension.

FIG. 4 shows the bending restrictor assembly 10 as used in extension. In FIG. 4, the pin 66 has moved so as to abut a side of the keyway 68. The edge 81 of the collar 14 is spaced from the edge 83 of the inner collar 78. Also, the pin 74 abuts a wall of the keyway 76. The edge 85 of the outer collar 70 is spaced further from the edge 87 of the second outer collar 80. Similarly, the pin 68 abuts an end of the keyway 82. Additionally, and furthermore, the pin 94 is moved so as to abut an end of the keyway 92 of the inner collar 90.

Figure 5:
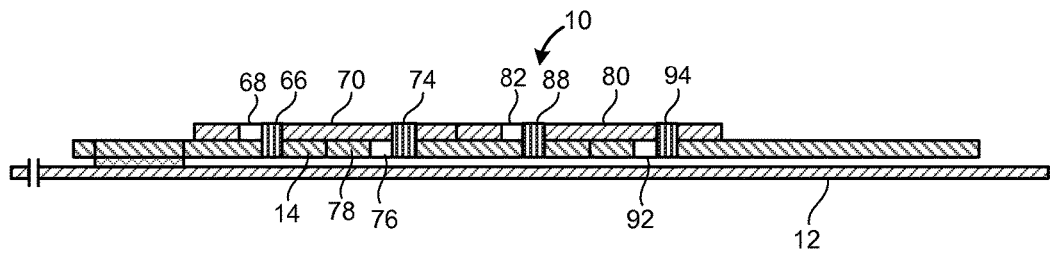
FIG. 5 is a partial cross-sectional view of the bending restrictor assembly of the prior art in which the bending restrictor assembly is shown in compression.

FIG. 5 shows the bending restrictor assembly 10 in compression. In this arrangement, the pin 66 abuts another side of the keyway 68. Pin 74 abuts another end of the keyway 76. Pin 88 abuts another end of the keyway 82. Pin 94 will also abut another end of the keyway 92. So as to further restrict bending movement in compression, the end edges 81 and 83 of the collar 14 and the inner collar 78 abut one another. Similarly, the end edges 85 and 87 of the outer collars will abut each other.

Figure 6:
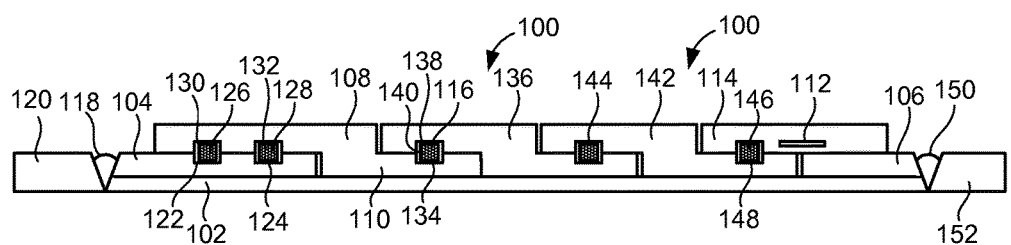
FIG. 6 is a cross-sectional view showing the bending restrictor assembly in accordance with a first embodiment of the present invention.

Referring to FIG. 6, there is shown the bending restrictor assembly 100 in accordance with the teachings of a first embodiment of the present invention. The bending restrictor assembly 100 includes a pipeline section 102 that has an outer diameter. A first pipe section 104 is affixed to the pipeline section 102 and overlies the outer diameter of the pipeline section 102. A second pipe section 106 is affixed to the pipeline section 102 in spaced relation to the first pipe section 104 and also overlies the outer diameter of the pipeline section 102. A first collar element 108 has a portion 110 that is positioned between the first pipe section 104 and the second pipe section 106. This portion 110 overlies the outer diameter of the pipeline section 102. A second collar element 112 has a portion 114 positioned between the first pipe section 104 and the second pipe section 106. In particular, the first collar element 108 and the second collar element 112 are movable relative to the each other as the pipeline section 102 is bent. A stop member 116 is cooperative with the first collar element 108 so as to limit the relative movement of the first collar element 108 with respect to the second collar element 112 as the pipeline section 102 is bent.

In particular, in FIG. 6, it can be seen that the first pipe section 104 will be secured to the pipeline section 102 by a weld 118. The pipeline section 102 and pipe section 104 are joined with the increased section modulus 120. The first pipe section 104 is secured to the pipeline section 102 by a single weld bead such that a wide transition area is provided in the area between the pipeline section 102 at the junction with the bending restrictor assembly 100. As such, this enhances the strength in this area of transition. It also avoids stresses and potential damage to this transition area of the pipeline section 102 caused by bending. The pipeline section 104 can be easily assembled by sliding along the pipeline section. The first pipe section 104 also provides increased wall thickness so ensure that the bending will take place at the intended location.

In FIG. 6, it can be seen that the first pipe section 104 includes a first notch 122 and a second notch 124. These notches 122 and 124 will extend circumferentially around the first pipe section 104. Similarly, the first collar element 108 includes matching notches 126 and 128. A cuboid element 130 is received with within the area between the first collar element 108 and the first pipe section 104 and, in particular, within the area defined by the corresponding notches 122 and 126. It can be seen that the corresponding notches 122 and 126 will have a width dimension that is greater than the thickness or width dimension of the cuboid element 130. Another cuboid element 132 is positioned within the corresponding notches 124 and 128. As such, as the first collar element 108 will move in one direction or another relative to the pipe section 104, the cuboid elements 130 and 132 will limit the amount of movement in one direction or the other. In other words, the shoulder associated with a notch on one of the first collar element 108 and the first pipe section 104 will contact the cuboid so as to limit the movement of the cuboid and also the movement of the first collar element 108.

The portion 110 of the first collar element 108 also includes a notch 134 formed therein. Another first collar element 136 is provided adjacent to the end of the first collar element 108 and also includes a notch 138. Notches 134 and 138 provide an area for the receipt of cuboid element 140 therein. Still another first collar element 142 is positioned at the end of the collar element 136 opposite to the collar element 108. Once again, a cuboid element 144 is accommodated within the corresponding notches of the collar element 136 and the collar element 142. The portion 114 of the second collar element 112 also includes a notch 146 therein. Notch 146 will correspond in location to that of the notch 148 of the collar element 142. Within the concept and various embodiments of the present invention, very large numbers of collar elements, such as collar elements 108, 136, 142 and 112 can be accommodated within the concept of the present invention. Each of the cuboid elements and the collar elements will be of a higher strength material than that of the pipeline section 102 or the pipe sections 104 and 106. Each of the collar elements 108, 136, 142 and 112 will slide in one direction or another as the pipeline section 102 is bent. As such, the corresponding cuboid elements 130, 132, 140, 144 and 146 will move relative to the notches in order to limit the movement of the collar elements.

The second pipe section 106 will have a configuration similar to that of the first pipe section 104. Pipe section 106 will be made of a material similar to that of the pipeline section 102. Another weld 150 will secure the second pipe section 106 and the pipeline section 102 to the another pipeline increased section modulus 152 of the pipeline.

Figure 7:
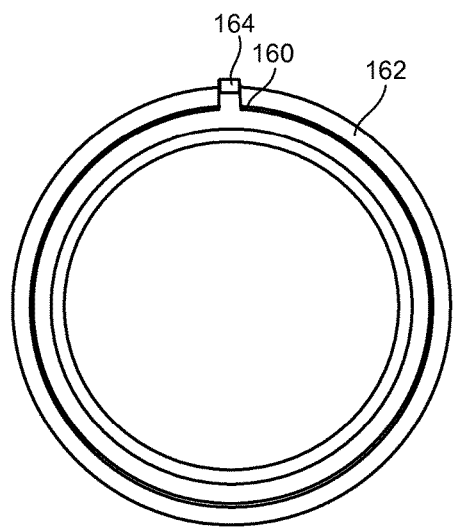
FIG. 7 is a partially cross-sectional view showing how the cuboid elements are introduced into the bending restrictor assembly of the first embodiment of the present invention.

FIG. 7 illustrates the unique manner in which the cuboid elements can be installed within the particular notches. In particular, it can be seen that there is a hole 160 that is provided in the outer collar element 162. Collar element 160 can correspond with any of the collar element shown in FIG. 6. In particular, the cuboid element 164 can be fed through the hole 160 so as to enter the area of the corresponding notches. The cuboid elements can be continuously fed through the hole 160 until they encircle the inner collar element. The cuboid elements will be in side-by-side relation in a location exterior of the outer diameter of the pipeline section 102.

Figure 7A:
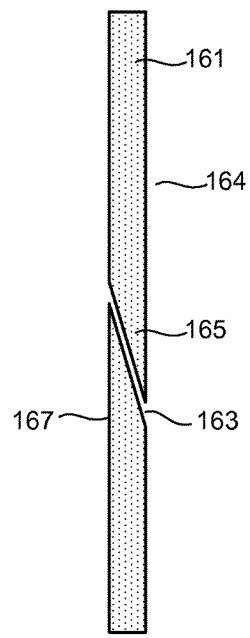
FIG. 7A shows an alternative form of the cuboid element as used in this embodiment of the present invention.

Referring to FIG. 7A, there is shown a plan view of an alternative form of the cuboid element 164 of the present invention. As can be seen, instead of several cuboid elements 164, as illustrated in FIG. 7, a single cuboid element (the number 164 in FIG. 7A shows the single buboid, which is used for the smaller cuboids as well) can be fed through the hole so as to extend within the notch of the collar elements. In particular, cuboid element 164 is a continuous ring 161 that has a split 163 therein at opposite ends thereof. One end 165 of the ring 161 is tapered so as to overlap with the tapered end 167 at the opposite end of the ring 161. Tapered ends 165 and 167 overlap in the area of the split 163. In this embodiment, one end, such as end 165, can be introduced through the hole 160 so as to feed continuously through the hole 160 until the ring 161 encircles the pipeline section 102 and/or the collar elements. Additionally, within the concept of the present invention, spheroid elements could also be utilized instead of the cuboid elements of FIG. 7 or the continuous ring of FIG. 7A.

Figure 8:
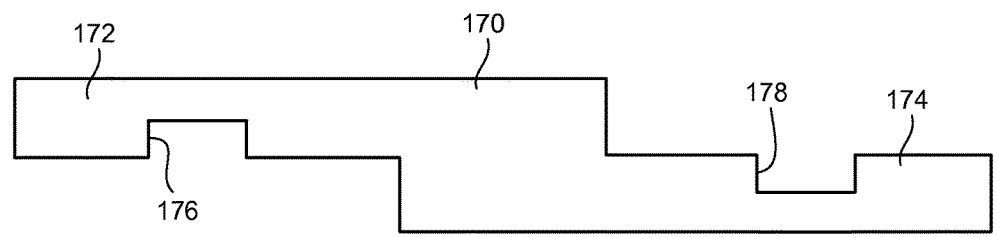
FIG. 8 is a cross-sectional view showing one configuration of the collar element of the first embodiment of the bending restrictor assembly of the present invention.

FIG. 8 shows one configuration of the first collar element 170. Collar element 170 is of a somewhat Z-shape configuration. There is a first portion 172 and a second section 174. The first section 172 is an outer section. The first section 172 will include the notch 176 therein. This notch 176 will face downwardly. The second section 174 is an inner section. Second section 174 also includes a notch 178 that faces outwardly. As such, the various collar elements 170 can be arranged serially so as to achieve the bending restrictor assembly of the present invention. The collar element 170 is integrally formed together.

Figure 9:
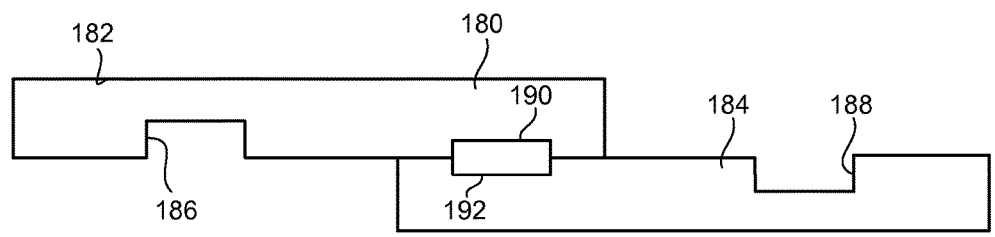
FIG. 9 is a cross-sectional view showing another configuration of the collar element as used in the bending restrictor assembly of the first embodiment of the present invention.

FIG. 9 shows an alternative form of the collar element 180. Collar element 180 includes the outer section 182 and the inner section 184. Outer section 182 includes a notch 186 that faces downwardly. The inner section 184 includes a notch 188 that faces outwardly. Additionally, the outer section 180 includes another notch 190 that will face and correspond to a notch 192 formed on the inner section 184. Corresponding notches 190 and 192 can receive a cuboid or other stop member therein so as to limit relative movement sliding movement between the outer section 180 and the inner section 184. In the form shown in FIG. 9, the collar element 180 can be of a two-piece construction. Once again, these will be arranged in serial and overlapping relationship along the length of the bending restrictor assembly of the present invention. The structures shown in FIGS. 8 and 9 can be applied individual or in combination in the various embodiments of the present invention.

Figure 10:
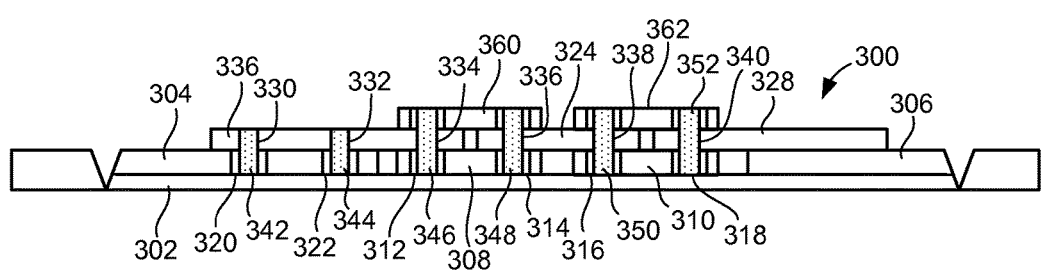
FIG. 10 is a cross-sectional view showing a second embodiment of the bending restrictor assembly of the present invention.

FIG. 10 shows a second embodiment of the bending restrictor assembly 300 of the present invention. In particular, there is a pipeline section 302 to which the first pipe section 304 and the second pipe section 306 are affixed in the manner described in the previous embodiment. The bending restrictor assembly 300 includes a first collar element 308 and a second collar element 310. Collar elements 308 and 310 have identical configurations. Collar elements 308 and 310 will be located between the first pipe section 304 and the second pipe section 306 and will be overlying the outer diameter of the pipe line 302. The first collar element 308 includes a first slot 312 and a second slot 314. The second collar element 310 includes a first slot 316 and a second slot 318. The first pipe section 304 has a first slot 320 and a second slot 322 formed therein. As will be described hereinafter, the slots are suitable for receiving stop members that are utilized so as to control the bending in accordance with teachings of the present invention.

In FIG. 10, it can be seen that there is a third collar element 324 that is positioned above the first collar element 308 and the second color element 310. The third collar element 324 has a first end 326 which will overlie the top of the first pipe section 304 and a second end 328 which overlies the second pipe section 306. The third collar element 324 includes receptacles 330, 332, 334, 336, 338 and 340. A pin 342 is affixed within the receptacle 330 and extends downwardly into the slot 320 of the first pipe section 304. It can be seen that the slot 320 has a length greater than the diameter of the pin 342. Similarly, pin 344 is affixed to the receptacle 332 and extends downwardly into the slot 322. Pin 346 is affixed to the receptacle 334 and extends downwardly into the slot 312. Pin 348 is affixed to the receptacle 336 and extends downwardly into the slot 314. Pin 350 is affixed to the receptacle 338 and extends downwardly into the slot 316. Additionally, pin 352 is affixed to the receptacle 340 and extends downwardly into the slot 318. In this configuration, as the pipeline section 302 is bent, there will be relative movement between the third collar element 324 and the first pipeline section 304, the first collar element 308, the second collar element 310 and the second pipeline section 306.

Within the concept of the present invention, a fourth collar element 360 will serve to sandwich the third collar element 324 with the first pipe section 304 and with the first collar element 308. The fourth collar element 360 includes slots that suitably receive the pins 346 and 348 therein. Another fourth collar element 362 has slots that receive pins 350 and 352 therein. When the fourth collar elements 360 and 362 are added, the third collar element 324 is suitably sandwiched. As such, this will enhance the ability to ensure the proper relative travel of the third collar element 324 with respect to the other components during the bending of the pipeline section.

Figure 11:
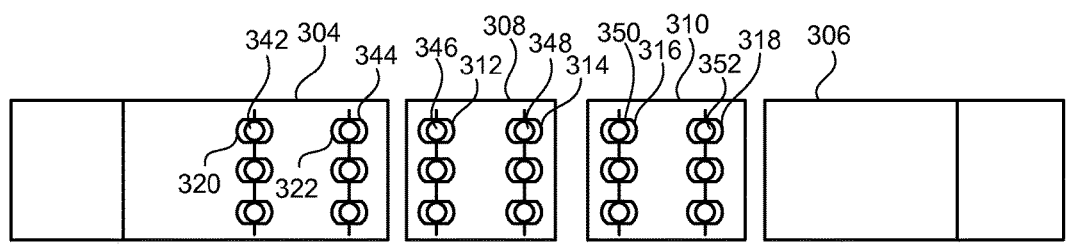
FIG. 11 is an isolated plan view of the first and second collar elements of the second embodiment of the present invention.

FIG. 11 is an isolated view of the first pipeline section 304, the first collar element 308, the second collar element 310 and the second pipeline section 306. As can be seen, the slots 312, 314, 316 and 318 will extend in spaced longitudinal relationship on the first pipe section 304, the first collar element 308, the second collar element 310 and the second pipe section 306. Additionally, there are also other slots laterally aligned with these apertures around the entire circumference of the first pipe section 304, the first collar element 308, the second collar element 310 in the second pipe section 306. It can be seen that the pins 342, 344, 346, 348, 350 and 352 are respectively received within each of the slots 330, 332, 334, 336, 338 and 340. Since each of the slots has a length greater than the diameter of respectively-received pins, there is a designated area for relative travel of the pin within the slot. As such, the pin will move toward one end of the slot during compression of the pipeline section and the other into the slot during expansion of the pipeline section. This is the manner in which the bending of the pipeline section can be suitably restricted or controlled.

Figure 12:
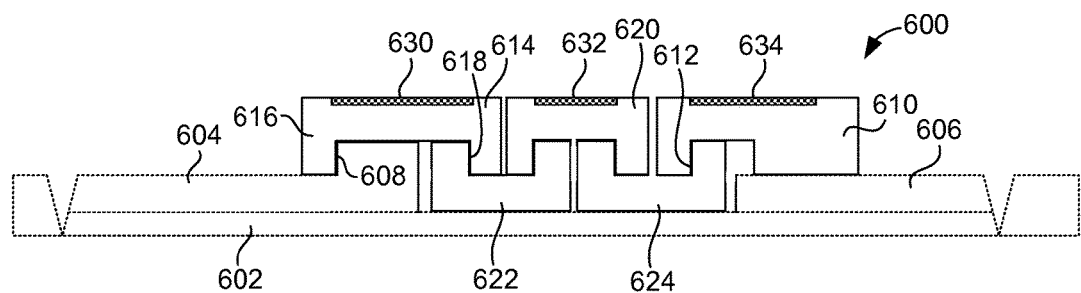
FIG. 12 is a cross-sectional view of a third embodiment of the bending restrictor assembly of the present invention.

FIG. 12 shows a third embodiment of the bending restrictor assembly 600 of the present invention. The bending restrictor assembly 600 is applied to pipeline section 602. A first pipe section 604 is affixed to the pipeline section 602 at one end. A second pipe section 606 is affixed to the pipeline section 602 in spaced relationship to the first pipe section 604. The first pipe section 604 can include a shoulder 608 that extends upwardly therefrom. The second pipe section 606 can has an inverted U-shaped member 610 slidably positioned thereon. The inverted U-shaped member 610 will include a shoulder 612 at one surface thereof. The first collar element 614 is also an inverted U-shaped member. The first collar element 614 has a flange 616 at one end thereof that will abut the shoulder 604. The first collar element 614 also includes another flange 618 extending inwardly therefrom. Another collar element 620 is positioned adjacent to the first collar element 614. This collar element 620 has a configuration similar to that of collar element 614 and includes a pair of flanges extending downwardly therefrom in spaced relationship. In this embodiment of the bending restrictor assembly 600 of the present invention, there is a pair of second collar elements 622 and 624. Second collar element 622 includes a pair of upwardly extending flanges at the opposite ends thereof. Similarly, the second collar element 624 also includes a pair of outwardly extending flanges. The collar element 620 will serve to receive one of the flanges of the second collar element 622 and one of the flanges of the second collar element 624 therein. The other flange of the second collar element 622 will be positioned adjacent to the downwardly extending shoulder 618 of the first collar element 614. The other flange of the second collar element 624 will be positioned adjacent to the shoulder 612 of the inverted U-shaped member 610. In this configuration, when the pipeline section 612 is bent to the intended radius, the various shoulders in flanges will abut one another so as to prevent further travel.

FIG. 12 shows, in particular, that bands or sleeves 630, 632 and 634 are respectively positioned over the collar elements 616, 620 and 610. These the bands or sleeve 630, 632 and 634 serve to securely retain each of the collar elements in their desired relationship while, at the same time, allowing relative movements between the collar elements. These bands 630, 632 and 634 serve to prevent any dislodgment of the collar elements from their intended position. The outer collars as shown in FIGURE are necessarily half shells.

Figure 13:
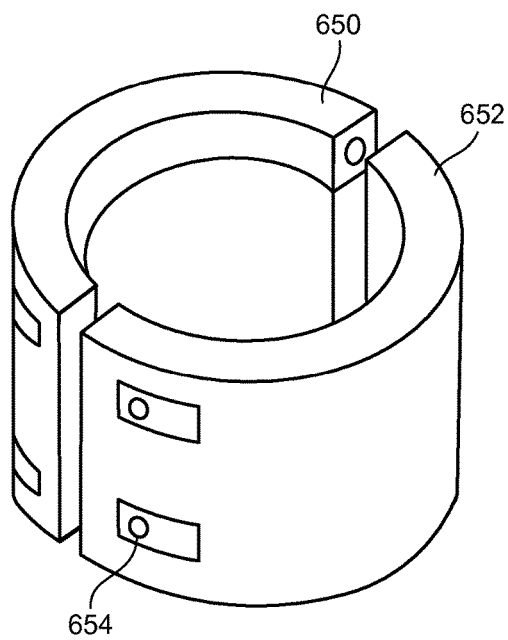
FIG. 13 shows the construction of one form of the collar elements of the third embodiment of the present invention.

Referring to FIG. 13, there is shown the configuration of the various half shell outer collar elements 610, 614 and 620. FIG. 12, each of these collar elements 610, 614 and 620 is secured to its desired position through the use of the bands or sleeves 630, 632 and 634 or as a bolted configuration shown in FIG. 13. FIG. 13 illustrates an alternative in which each of the collar elements 610, 614 and 620 has a configuration utilizing a first half-shell 650 and a second half-shell 652. Suitable fasteners, such as bolts 654, are utilized so as to secure the C-shaped half-shells 650 and 652 in end-to-end relationship around the pipeline section 602 and over the inner collar elements 622 and 624. In FIG. 13, it can be seen that the first half-shell 650 has a pair of internal shoulders that would serve to abut the corresponding shoulder of the inner collar.

Importantly, the half-shells 650 and 652 can be used as the outer collar elements of the previous embodiments, such as FIG. 6. Additionally, the cuboid element shown in FIG. 7A can be utilized in association with notches formed interior of the half-shells 650 and 652.

In the present invention, the pipe sections and pipeline sections of the various embodiments are welded and joined to the increased section modulus of the pipeline so as to provide increased wall thickness of the area of the bending restrictor assembly. So as to provide a proper transition, the ends of each of these pipeline sections should taper toward the outer diameter of a further adjoining pipeline section in order to assure that bending will occur in the desired location.

The various bending restrictor assemblies of the present invention can be protected from corrosion by various methods. In those instances where the final bend configuration has been achieved, the connections between the collars in certain cases are obsolete. The stop members, in such cases, can be made from a material that rapidly corrodes in saltwater. The collars will remain protected from corrosion and provide further support against ovalizing, during operational phases.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A bending restrictor assembly for use with a subsea pipeline, the bending restrictor assembly comprising:
   a pipeline section having an outer diameter, said pipeline section being of a rigid material and adapted to be connected to the subsea pipeline;
   a first pipe section affixed to said pipeline section and overlying said outer diameter of said pipeline section;

a second pipe section affixed to said pipeline section in spaced relation to said first pipe section and overlying said outer diameter of said pipeline section;

a first collar element having at least a portion positioned between said first and second pipe sections, said portion overlying said outer diameter of said pipeline section;

a second collar element having at least a portion positioned between said first and second pipe sections, said portion of said second collar element overlying said outer diameter of said pipeline section, said first and second collar elements being rigid and movable in relation to each other as said pipeline section is bent, at least one of said first collar element and second collar element being affixed to at least one of said first pipe section and said second pipe section; and at least one stop member cooperative with said first and second collar elements and one pipe section so as to limit the relative movement of said first and second collar elements so as to limit the bending of said pipeline section at a point beyond an elastic limit of the pipeline section in order to achieve a permanent bend of said pipeline section.

2. The bending restrictor assembly of claim 1, said first collar element overlying said second collar element, said stop member comprising:

a first flange integrally formed of said first collar element extending inwardly thereof so as to define a first shoulder; and a second flange integrally formed with said second collar element and extending outwardly thereof so as to define a second shoulder, said first flange movable with respect to said second flange as the pipeline section is bent.

3. The bending restrictor assembly of claim 1, said first collar element overlying said second collar element, said stop member comprising a pair of flanges formed on said first collar element and extending inwardly of said first collar element, said pair of flanges being in spaced relation to each other, said second collar element comprising a pair of second collar elements, each of said pair of second collar elements having a flange extending outwardly thereof, the flanges of said pair of second collar elements position between said pair of flanges of said first collar element.

4. The bending restrictor of claim 3, further comprising:

a sleeve overlying said first and second collar elements.

5. The bending restrictor assembly of claim 1, said first pipe section having an end opposite said first and second collars that tapers toward said outer diameter of said pipeline section, said second pipe section having an end opposite said first and second collar elements that tapers toward said outer diameter of said pipeline section.

6. The bending restrictor assembly of claim 1, said first collar element comprising a first half-shell and a second half-shell that are jointed together.

* * * * *